United States Patent [19]
Xuan et al.

[11] Patent Number: 5,956,217
[45] Date of Patent: Sep. 21, 1999

[54] REFERENCE DISK FOR DETERMINING GLIDE HEIGHT

[75] Inventors: Jialuo Jack Xuan, Milpitas; Chung Yuang Shih, Cupertino; Thanh Nguyen, Fremont, all of Calif.

[73] Assignee: Seagate Technology, Inc., Scotts Valley, Calif.

[21] Appl. No.: 08/919,204

[22] Filed: Aug. 28, 1997

[51] Int. Cl.$^6$ ................................................ G11B 5/82
[52] U.S. Cl. ............................................................ 360/135
[58] Field of Search ................................... 360/133, 135

[56] References Cited

U.S. PATENT DOCUMENTS

| | | | |
|---|---|---|---|
| 3,674,340 | 7/1972 | Jacob | 369/494 |
| 3,764,218 | 10/1973 | Schedewie | 356/118 |
| 3,938,878 | 2/1976 | Fox | 350/150 |
| 4,060,306 | 11/1977 | Swaminathan | 350/87 |
| 4,139,263 | 2/1979 | Lehureau et al. | 350/157 |
| 5,062,021 | 10/1991 | Ranjan et al. | 360/135 |
| 5,128,914 | 7/1992 | Kurata et al. | 369/44.37 |
| 5,166,006 | 11/1992 | Lal et al. | 428/612 |
| 5,202,810 | 4/1993 | Nakamura et al. | 360/135 |
| 5,273,834 | 12/1993 | Hoover et al. | 428/694 ST |
| 5,391,522 | 2/1995 | Goto et al. | 501/4 |
| 5,402,407 | 3/1995 | Eguchi et al. | 369/112 |
| 5,416,755 | 5/1995 | Endo et al. | 369/13 |
| 5,504,646 | 4/1996 | Tanaka et al. | 360/135 |
| 5,550,696 | 8/1996 | Nguyen | 360/135 |
| 5,586,040 | 12/1996 | Baumgart | 360/135 X |
| 5,635,269 | 6/1997 | Weir et al. | 428/65.3 |
| 5,680,285 | 10/1997 | Nakamura et al. | 360/135 |
| 5,768,076 | 6/1998 | Baumgart et al. | 360/135 |

FOREIGN PATENT DOCUMENTS 0652554  5/1995  European Pat. Off. .

OTHER PUBLICATIONS a New Laser Texturing Technique for High Performance Magnetics, vol. 31, No. 6, pp. 2946–2951, Nov. 1995.

*Primary Examiner*—John H. Wolff
*Attorney, Agent, or Firm*—McDermott, Will & Emery

[57] ABSTRACT

A reference disk, used to determine the glide height of a transducer head above the surface of a magnetic recording medium, is accurately formed by employing a laser light beam to produce protrusions on the reference disk. The protrusions can be formed in a variety of effective patterns to obtain a stable electrical signal. Embodiments include circumferential rows of uniformly or randomly spaced protrusions.

19 Claims, 4 Drawing Sheets

REFERENCE DISK FOR DETERMINING GLIDE HEIGHT

TECHNICAL FIELD

The present invention relates to a reference disk for use in a glide tester apparatus to determine the glide height of a transducer head above the surface of a magnetic recording medium, and to a method for manufacturing a reference disk. The invention has particular applicability in accurately measuring the glide height of the transducer head above the surface of a magnetic recording medium required to have a minimal glide height.

BACKGROUND ART

Thin film magnetic recording disks and disk drives are conventionally employed for storing large amounts of data in magnetizable form. In operation, a typical contact start/stop (CSS) method involves floating a transducer head in air at a predetermined distance from the surface of the disk due to dynamic pressure effects caused by airflow generated between the sliding surfaces of the transducer head and the disk. During reading and recording operations, the transducer head is maintained at a controlled distance from the recording surface, supported on a bearing of air as the disk rotates, such that the transducer head can be freely moved in both the circumferential and radial directions allowing data to be recorded on and retrieved from the surface of the disk at a desired position. It is considered desirable during reading and recording operations to maintain each transducer head as close to its associated recording surface as possible, i.e., to minimize the flying height or glide of the transducer head.

There are, however, inevitable topographical asperities, typically of only a few microns in diameter and few microinches in height, formed on the surface of a conventional magnetic recording media, which surface comprises a data zone and a landing zone. These asperities stem from a variety of sources, e.g., thermal treatment, magnetic orientation of the magnetic alloy layer, groove generation and polishing. Moreover, these asperities vary in height, diameter and frequency among magnetic recording media.

Conventional disk drives are manufactured with precise specifications, including a precise maximum glide height for a transducer head flying above the data zone. In recognition of the inevitable topographical asperities formed on the data zones of magnetic recording media, conventional practices comprise testing each magnetic recording medium to determine if the particular magnetic recording medium satisfies the maximum glide height requirement for a particular magnetic disk drive. Such testing typically comprises the use of a device known as a glide tester commercially available from various sources, such as Cambrian or PhaseMatrix of California.

Conventional glide testers accommodate the particular magnetic recording medium to be tested and a reference disk typically containing a single protrusion thereon formed by photolithographic techniques and having a defined height, i.e., glide height. The reference disk is rotated and a transducer head lowered until the transducer head contacts the protrusion at which point a first electrical signal is generated indicative of glide height as a function of the height of the reference disk protrusion. The magnetic recording medium is then rotated and the transducer head lowered onto the media surface until contact is made to generate a second electrical signal. The second electrical signal is compared to the first electrical signal to determine whether the tested magnetic recording medium satisfies the glide height requirement for a particular disk drive. The proper functioning of the glide tester, manifestly, requires the generation of a strong, stable and repeatable signal for effective comparison. Of particular significance is the necessity for the protrusion on the reference disk to accurately simulate topographical asperities inevitably present on the surface of a magnetic recording media.

There are significant disadvantages attendant upon conventional practices for manufacturing and employing a reference disk comprising a single protrusion formed by photolithographic techniques. For example, the protrusion formed by photolithographic techniques is significantly greater in diameter than actual topographical asperities formed on the data zone of a magnetic recording medium and, hence, does not provide a basis for an accurate simulation. The protrusion typically produced by a photolithographic technique, such as made by StorMedia or Akashic of California, is about 100 $\mu$m to about 200 $\mu$m in diameter; whereas, topographical asperities are generally only a few microns in diameter. A single protrusion formed by a photolithographic technique does not accurately simulate the aerodynamic conditions generated by a plurality of protrusions characteristic of inevitable topographical asperities. Additionally, a single photolithographically formed protrusion wears out in a short period of time as a result of repeated contacts with the transducer head of the glide tester and, hence, yields inconsistent results. Moreover, the reference disk comprising a single photolithographically formed protrusion must be replaced frequently. It is also extremely expensive to produce a reference disk having a protrusion formed by photolithographic techniques.

Accordingly, there exists a need for a reference disk for use in a glide tester to accurately determine the glide height above the surface of a magnetic recording medium. There also exists a need for an efficient and cost effective method to produce a reference disk containing protrusions simulating actual topographical asperities on the surface of a magnetic recording media.

DISCLOSURE OF THE INVENTION

An object of the present invention is a reference disk for accurately determining the glide height above the surface of a magnetic recording medium.

Another object of the present invention is a method of manufacturing a reference disk for use in a glide tester to accurately determine the glide height above the surface of a magnetic recording medium.

Additional objects, advantages and other features of the invention will be set forth in part in the description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by a reference disk for determining the glide height above the surface of a magnetic recording medium, which reference disk comprises a surface and at least one protrusion formed on the surface by a laser light beam.

A further aspect of the present invention is a reference disk for determining the glide height above the surface of a magnetic recording medium, which reference disk comprises at least one circumferential row of protrusions, which circumferential row is spaced radially from the center of the disk.

Another aspect of the present invention a method of manufacturing a reference disk for determining the glide height above the surface of a magnetic recording medium, which method comprises exposing a surface of a disk to a laser light beam to form at least one protrusion thereon.

A further aspect of the present invention is a method of manufacturing a reference disk for determining the glide height above a surface of a magnetic recording medium, which method comprises exposing a surface of a disk to a laser light beam to form at least one circumferential row of protrusions, which circumferential row is spaced radially from the center of the disk.

Additional objects and advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

Figure 1:
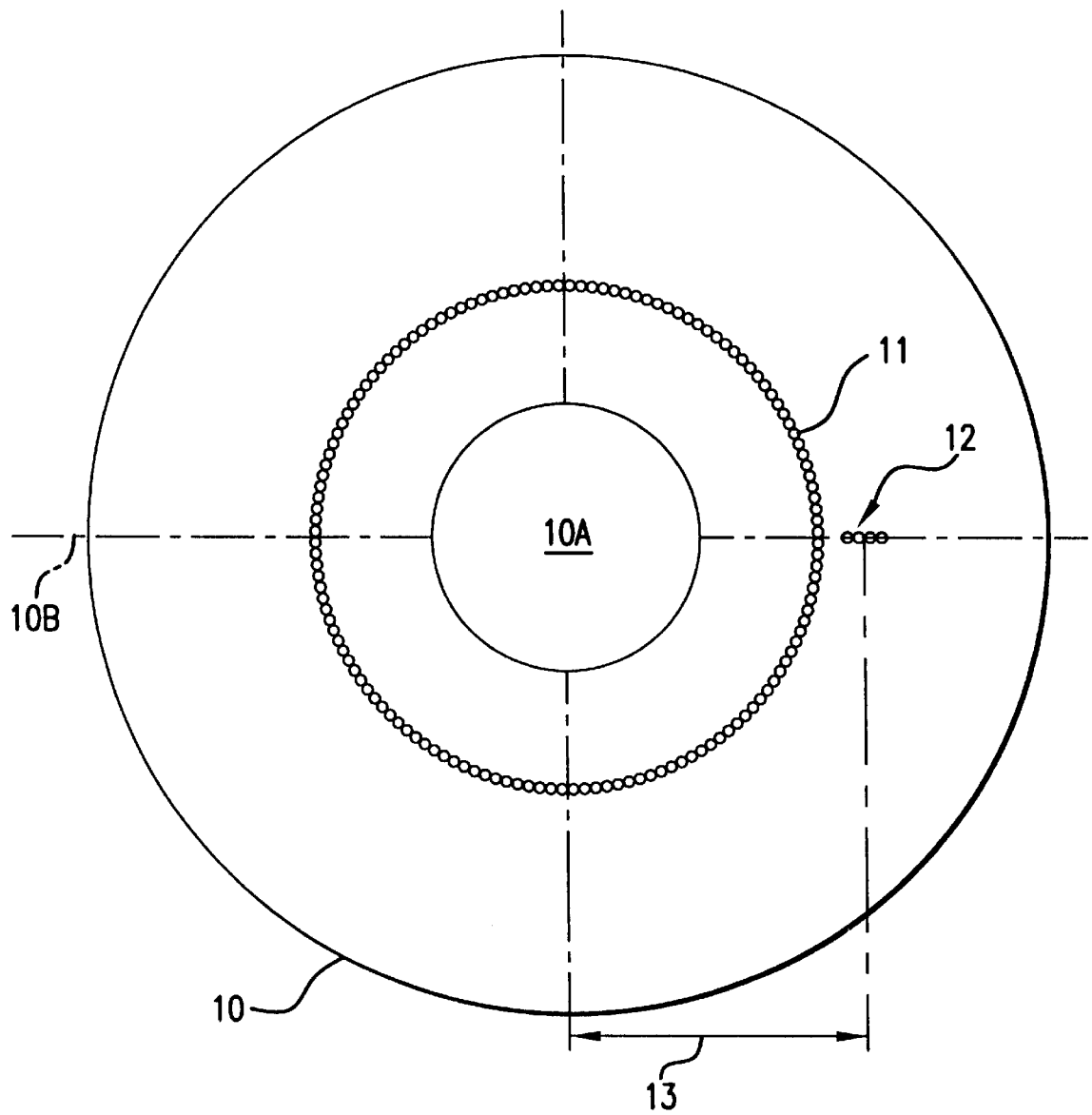
FIG. 1 schematically illustrates the surface of a reference disk in accordance with an embodiment of the present invention.

In accordance with the present invention, a reference disk is produced comprising a pattern of protrusions which substantially accurately simulates the height, diameter and spacing of topographical asperities typically formed on the surface of magnetic recording media. Moreover, in accordance with the present invention, such a reference disk is fabricated in a cost effective, efficient manner. A reference disk in accordance with the present invention can be used in conventional glide testers to accurately determine the glide height of a transducer head above the surface of a magnetic recording medium.

In an embodiment of the present invention, a pattern of protrusions is formed by exposing the surface of a disk to a laser light beam, preferably a pulsed, focused, laser light beam, to accurately form a plurality of protrusions extending above the surface of the disk to a controlled height and having a controlled diameter and a controlled spacing. The use of a laser light beam to form a protrusion is considerably less expensive than conventional photolithographic processing. Moreover, the use of a pulsed, focused laser light beam enables the formation of a plurality of protrusions which substantially accurately simulate topographical asperities formed on the surface of magnetic recording media.

After extensive experimentation and investigation, it was found that certain types of protrusion patterns are particularly effective in generating strong, stable and repeatable electric signals upon contact with the transducer head during glide height testing. Such patterns are, therefore, particularly effective for accurately determining the glide height above the data zone of a magnetic recording medium. Such particularly effective protrusion patterns in accordance with an embodiment of the present invention comprise at least one circumferential row of protrusions, which circumferential row is radially spaced from the center of the disk. Embodiments of the present invention include forming a plurality of radially spaced circumferential rows of protrusions. In aspects of these embodiments, the protrusions are spaced apart substantially uniformly in the radial direction and/or substantially uniformly in the circumferential direction. In other aspects of such embodiments, the protrusions are randomly spaced in a radial and/or circumferential direction. For example, embodiments of the present invention comprise a reference disk having three to eight radially spaced circumferential rows of protrusions, which circumferential rows are uniformly or randomly spaced in a radial direction and/or uniformly or randomly spaced in a circumferential direction.

The mechanism underlying the effectiveness of a reference disk comprising a plurality of radially spaced circumferential rows of protrusions for accurately determining the glide height above the surface of a magnetic recording medium is not known. However, it is believed that a plurality of radially spaced circumferential rows of protrusions accurately simulate the topographical asperities typically formed on the surface of a magnetic recording medium.

The substrate employed to produced the reference disk in accordance with the present invention can comprise any of various materials, such as a glass, ceramic or glass-ceramic material, and can further comprise a metallic coating thereon, such as a coating of nickel or a nickel alloy. Laser beam technology has been employed to texture the surface, i.e., landing zone, of a magnetic recording medium by forming a plurality of protrusions thereon. Such conventional laser beam technology can be employed to produce protrusions on a reference disk in accordance with the present invention. As such laser beam technology is conventional, it is not described herein in detail. Reference is made to European Patent Application 0652554A1; Ranjan et al., U.S. Pat. No. 5,062,021; and Baumgart et al. "A New Laser Texturing Technique for High Performance Magnetic Disk Drives," IEEE Transactions on Magnetics, Vol. 31, No. 6, pp. 2946–2951, November 1995. The laser beam texturing techniques disclosed is copending Application Ser. No. 08/666,374 filed on Jun. 27, 1996 and in copending Application Ser. No. 08/647,407 filed on May 9, 1996 can also be employed in practicing the present invention. The entire disclosures of European Patent Application EP 0652554 A1, Ranjan et al., Baumgart et al., and copending Application Ser. Nos. 08/666,374 filed Jun. 27, 1996 and 08/647,407 filed May 9, 1996 are incorporated herein by reference.

In employing laser beam technology to form protrusions on glass or ceramic material surfaces, it has been found particularly suitable to employ a $CO_2$ laser source. It has also been found suitable to rotate the substrate, particularly during laser beam formation of circumferential rows of protrusions.

One having ordinary skill in the art could easily optimize the height, diameter and spacing of the laser beam formed protrusions consistent with the disclosed objective herein. For example, it has been found suitable to form protrusions having a height of about 100 Å to about 300 Å, a diameter of about 3 μm to about 9 μm, such as about 5 μm to about 7 μm, and a protrusion spacing of about 30 μm to about 100 μm, such as about 50 μm to about 80 μm.

An embodiment of the present invention is depicted in FIG. 1 and comprises a reference disk 10 having a diameter from its center 10A to a circumferential point 10B of 4 or 5 inches consistent with conventional magnetic recording media. A circumferential alignment pattern of protrusions 11 can be formed to facilitate aligning reference disk 10 with the reference transducer head of a glide tester apparatus. In accordance with the embodiment depicted in FIG. 1, a laser beam protrusion pattern 12 is formed comprising a linear row of radial protrusions, with four protrusions illustrated, although the number of protrusions can vary. The center of the radially extending strip of protrusion 12 is spaced at about 1.2 inches from the center 10A of reference disk 10, indicated by reference numeral 13.

Figure 2:
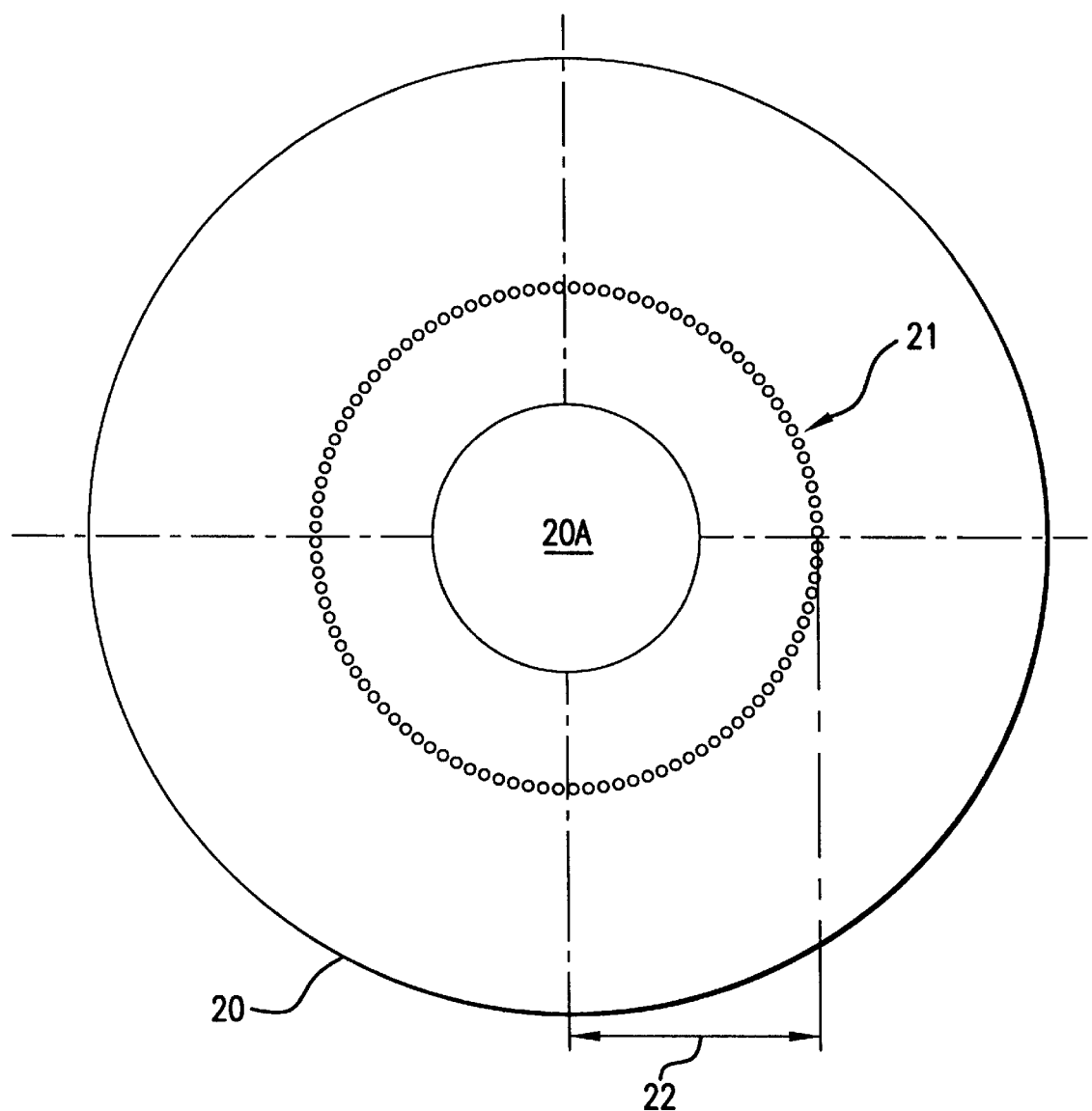
FIG. 2 schematically illustrates a surface of a reference disk comprising a circumferential row of protrusions in accordance with another embodiment of the present invention.

Another embodiment of the present invention found particularly effective is depicted in FIG. 2 and comprises reference disk 20 having a center at 20A. In order to facilitate understanding of the thrust of the present invention, alignment patterns and reference points have been omitted. Reference disk 10 is subjected to a pulsed, focused laser light beam to form a circumferential ring 21 radially spaced from the center 20A by a distance 22 and comprising a plurality of protrusions having a substantially uniform height, diameter and spacing. It has been found suitable to form circumferential row 21 at a radial distance 22 of about 30 mm from center 20A of reference disk 20, which is 95 mm in diameter.

Figure 3:
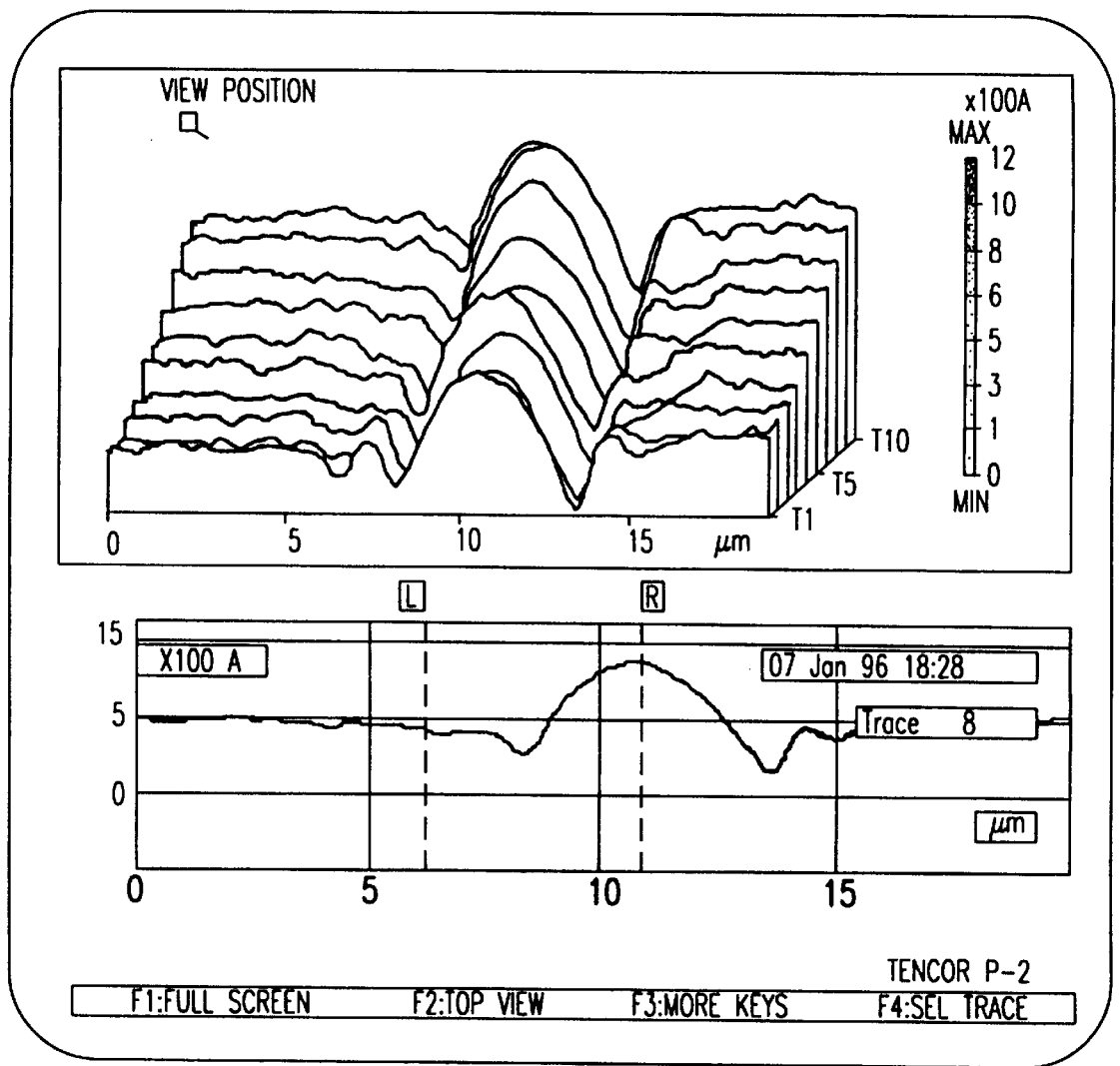
FIG. 3 is a mechanical stylus surface profile of the protrusion pattern on the disk illustrated in FIG. 1.

FIG. 3 represents a mechanical stylus surface profile of the embodiment depicted in FIG. 1 comprising a radially extending substantially linear strip of 12 of protrusions. The uniformity of the laser light beam formed protrusions is apparent.

Figure 4A:
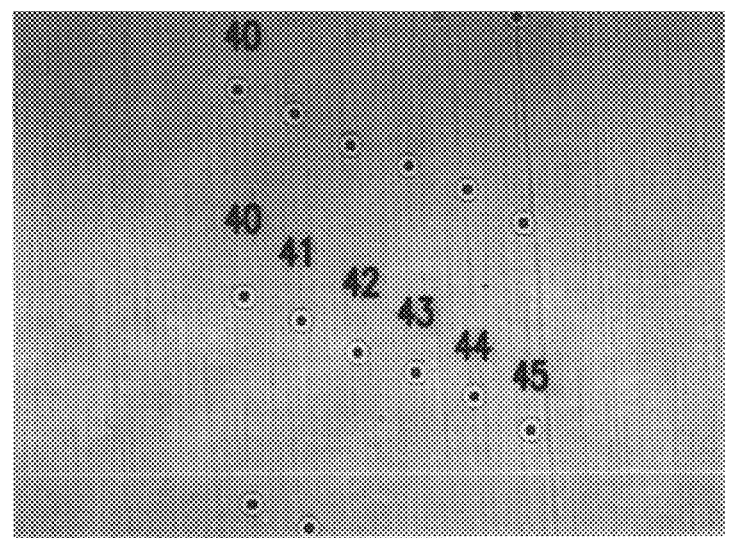
FIGS. 4A through 4C schematically illustrate circumferential rows of protrusions in accordance with other embodiments of the present invention.

It has been found particularly effective in obtaining a strong, stable and repeatable signal to form a laser light beam protrusion pattern comprising a plurality of radially spaced circumferential rows of protrusions. FIG. 4A illustrates a laser light beam formed pattern comprising six radially spaced circumferential rows of protrusions, wherein a protrusion in each radially extending circumferential row is identified by reference numerals 40 through 45. The radially spaced apart circumferential rows of protrusions can be advantageously formed so that the protrusions exhibit a substantially uniform height, diameter and spacing. The protrusions can also be formed so that they are substantially uniformly aligned in a radial direction and/or substantially radially aligned in a circumferential direction. The protrusions can also be randomly formed in a radial direction and/or randomly formed in a circumferential direction. In the embodiment depicted in FIG. 4A, the protrusions are substantially uniformly aligned in a radial direction and in a circumferential direction.

Figure 4B:
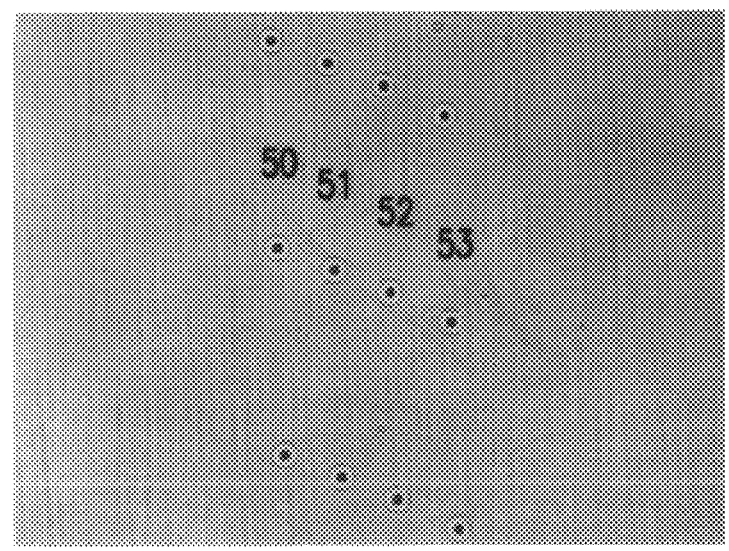

Another embodiment of the present invention is illustrated in FIG. 4B and comprises a plurality of four radially spaced circumferential rows of protrusions, wherein a protrusion in each circumferential row is identified by reference numerals 50 through 53, which are substantially uniformly aligned in a radial direction and in a circumferential direction. The protrusions in this embodiment also exhibit a substantially uniform height, diameter and spacing.

Figure 4C:
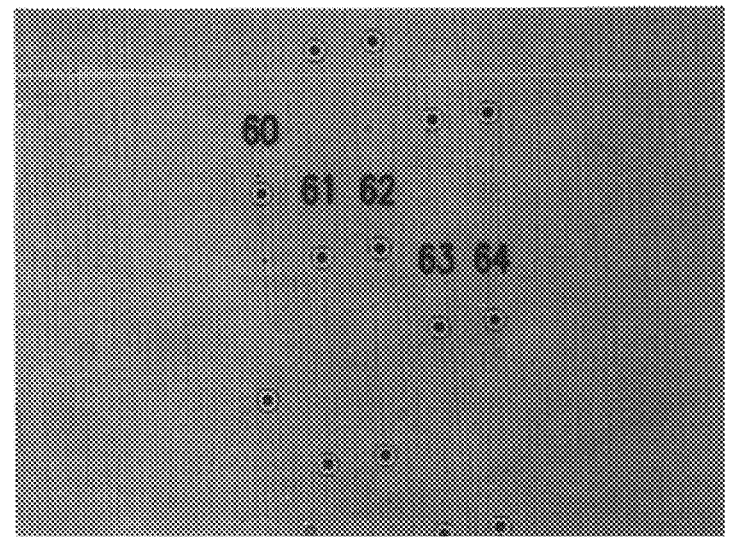

The embodiment depicted in FIG. 4C comprises five radially extending circumferential rows of protrusions which are substantially uniform in height, diameter and spacing. However, in the embodiment depicted in FIG. 4C, the protrusions are randomly formed in a radial direction, as indicated by the protrusions 60 through 64, each of which is in a different circumferential row.

In accordance with the present invention, a reference disk for determining the glide height above the data zone of a magnetic recording medium is fabricated by employing laser light beam technology to form a plurality of protrusions extending above the surface of reference disk. The laser light beam can be advantageously pulsed and focused to obtain a uniform array of protrusions substantially accurately simulating actual topographical asperities formed on the surface of a magnetic recording media. The substrates employed to produce the reference disk in accordance with the present invention can comprise any of various materials, such as a glass, ceramic or glass-ceramic material having a metallic coating thereon, such as nickel or a nickel alloy. The present invention enables the formation of a reference disk for glide testing to accurately determine whether the glide height of a transducer head above the surface of a magnetic recording medium satisfies the requirements for a particular disk drive.

The use of a laser light beam formed pattern in accordance with the present invention enables the production of a reference disk at a significantly reduced cause vis-à-vis conventional photolithographic procedures. In addition, the reference disks produced in accordance with the present invention are superior to conventional reference disks in that they enjoy greater durability and provide consistently accurate results. The present invention encompasses the formation of various protrusion patterns, such as a plurality of radially spaced circumferential rows of protrusions randomly or uniformly aligned in a radial direction and/or circumferential direction, to provide a strong, stable repeatable signal during glide testing. The present invention enjoys utility in various conventional glide testers to determine the glide height of a transducer head above a surface of any of various types of magnetic recording media.

Only the preferred embodiment of the invention and but a few examples of its versatility are shown and described in the present disclosure. It is to be understood that the invention is capable of use in various other combinations and environments and is capable of changes or modifications within the scope of the inventive concept as expressed herein.

What is claimed is:

1. A reference disk comprising a surface having a pattern extending to a predetermined height above the reference disk surface, the pattern comprising at least one protrusion formed by a laser light beam, the reference disk capable of use in a glide tester to accurately determine the glide height above a textured landing zone on a surface of a separate magnetic recording disk by correlating the glide height to the height of the pattern.

2. The reference disk according to claim 1, comprising a substrate; a metallic layer thereon; and a plurality of protrusions are formed on the metallic layer.

3. The reference disk according to claim 2, wherein the pattern comprises at least one circumferential row of protrusion, which circumferential row is spaced radially from the center of the disk.

4. The reference disk according to claim 3, wherein the protrusions have: a substantially uniform height of about 100 Å to about 300 Å, a substantially uniform diameter of about 3 μm to about 9μ; and a substantially uniform spacing between protrusions of about 30 μm to about 100 μm.

5. The reference disk according to claim 3, wherein the pattern comprises a plurality of radially spaced circumferential rows of protrusions.

6. The reference disk according to claim 3, wherein the pattern comprises five circumferential rows of protrusions, which protrusions are randomly spaced in a radial direction.

7. The reference disk according to claim 3, in combination with a glide tester.

8. The combination according to claim 7, further comprising the separate magnetic recording disk.

9. The reference disk according to claim 2, wherein the pattern comprises at least one radially extending substantially linear row of protrusions.

10. A method of manufacturing a reference disk, which method comprises exposing a surface of a disk to a laser light beam to form a pattern extending to a predetermined height above the reference disk surface, the pattern comprising at least one protrusion, wherein the reference disk is capable of use in a glide tester to accurately determine the glide height above a textured landing zone on a separate magnetic recording disk by correlating the glide height to the height of the pattern.

11. The method according to claim 10, wherein the disk comprises a substrate and a metallic layer thereon, which method comprises exposing the surface of the metallic layer to a pulsed, focused laser light beam to form a plurality of protrusions on the surface of the metallic layer.

12. The method according to claim 10, comprising:
    rotating the disk; and
    forming at least one circumferential row of protrusions, which circumferential row is radially spaced from the center of the disk.

13. The method according to claim 12, comprising forming protrusions having a substantially uniform height, diameter and spacing.

14. The method according to claim 12, further comprising determining the glide height above a data zone of the magnetic recording disk by correlating the glide height to the height of the pattern on the reference disk surface.

15. The method according to claim 12, comprising forming a plurality of radially spaced circumferential rows of protrusions.

16. The method according to claim 15, comprising forming a plurality of radially spaced circumferential rows of protrusions, which protrusions are substantially uniformly spaced in a radial direction and in a circumferential direction.

17. The method according to claim 16, comprising forming three to six circumferential rows of protrusions.

18. The method according to claim 15, comprising forming five radially spaced circumferential rows of protrusions, which protrusions are randomly spaced in a radial direction.

19. The method according to claim 10, comprising forming at least one radially extending substantially linear row of protrusions.

* * * * *